Figure 1:
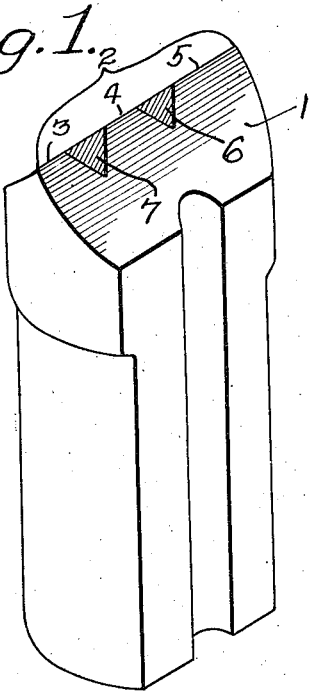

C. A. BRAWN.
ROCK DRILL BIT.
APPLICATION FILED MAR. 23, 1918.

1,283,646.

Patented Nov. 5, 1918.
3 SHEETS—SHEET 1.

Witnesses,
E. E. Reichart
Augustus B. Cppee

Inventor,
Charles A. Brawn
By Joshua R. H. Potts
his Attorney

C. A. BRAWN.
ROCK DRILL BIT.
APPLICATION FILED MAR. 23, 1918.

1,283,646.

Patented Nov. 5, 1918.
3 SHEETS—SHEET 2.

Witnesses,
E. E. Reichert
Augustus B. Copper

Inventor,
Charles A. Brawn
By Joshua R. H. Potts
his Attorney

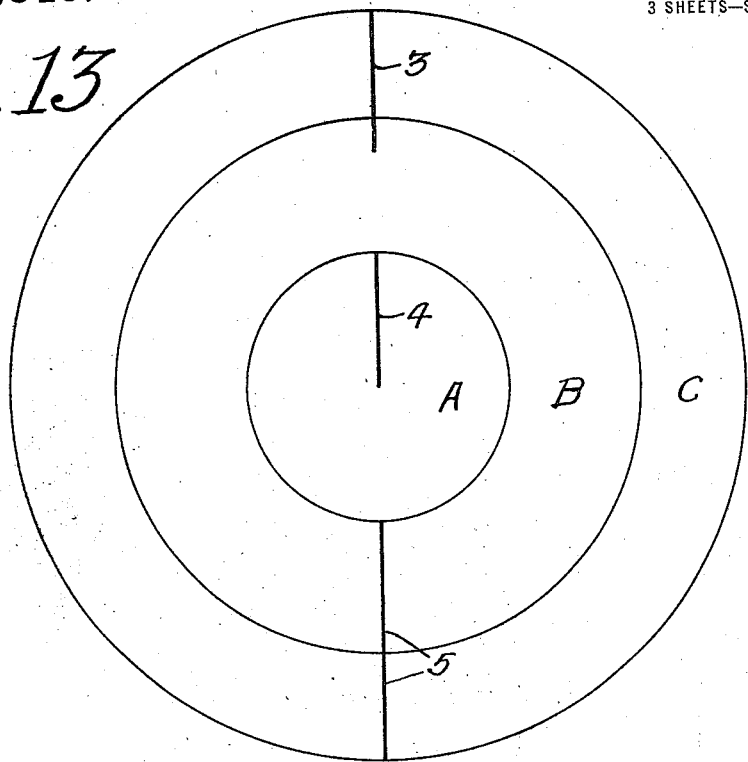
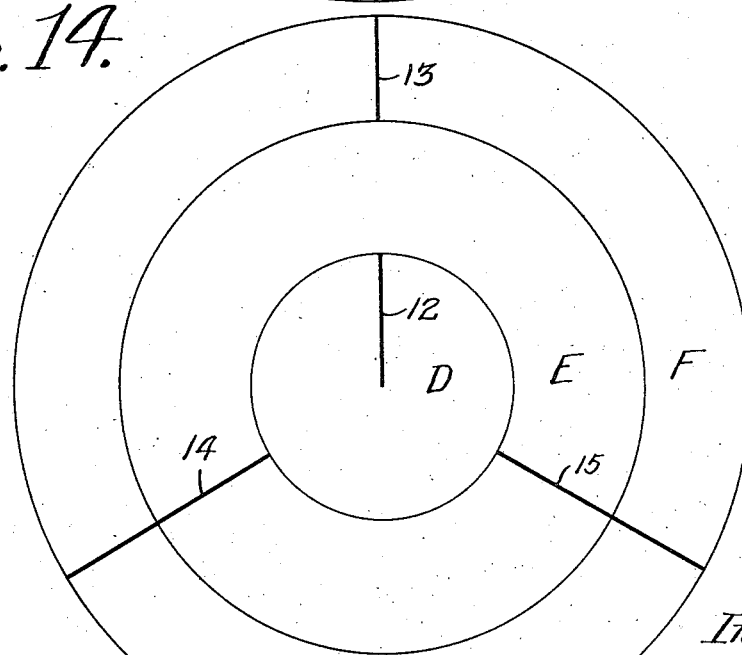

UNITED STATES PATENT OFFICE.

CHARLES A. BRAWN, OF PHILADELPHIA, PENNSYLVANIA.

ROCK-DRILL BIT.

1,283,646.  Specification of Letters Patent.  Patented Nov. 5, 1918.

Division in part of application Serial No. 224,149, filed March 23, 1918. This application filed March 23, 1918. Serial No. 224,150.

*To all whom it may concern:*

Be it known that I, CHARLES A. BRAWN, a citizen of the United States, residing at Philadelphia, in the county of Philadelphia and State of Pennsylvania, have invented certain new and useful Improvements in Rock-Drill Bits, of which the following is a specification.

The main object of my present invention, as in my other application for United States patent for rock drill bits, filed March 23, 1918, Serial No. 224,149, is to construct such drill bits in a manner that all portions of the cutting edge on the active surface thereof will perform substantially the same amount of work thereby preventing one cutting portion of the bit from wearing away sooner than other cutting portions of the bit as has been the difficulty with drill bits made and used prior to my invention; it being known that when one portion of the cutting edge, usually the portion nearest the circumference, wears more quickly than another portion, the drill bit often becomes bound within the drill hole of the rock or the like and must be removed and a bit of smaller diameter inserted to continue the drilling operation.

The mechanical principle on which my improved drill bit is based and constructed is the distribution of cutting edge on the active face of the drill bit in proportion to the area over which the respective portions of said face of the drill will operate in one complete revolution of the drill; the principle of construction being especially applicable to drills which operate by successive blows against the surface to be drilled with a rotary motion of the drill between each blow. This principle is carried out in structure by providing a drill bit in which the cutting edge is recessed or interrupted at points on the face of the bit where otherwise the edge within its length would not be in proportion to the area covered by the drill in its operatiton.

The mathematical principle involved in making the proper distribution of cutting edges, as above noted, is the ratio of the areas of concentric annuli into which the surface to be drilled may be considered to be divided. Since the area of an annulus equals the sum of its diameters divided by the difference of its diameters and this quotient multiplied by the constant .7854, it follows that if around a central circle there are to be drawn, or considered to be drawn, several successive annuli, each of a radial width equal to the radius of the central circumscribed circle, then the area of such annuli may be expressed as multiples of the area of the central circumscribed circle and in relation to each other in the constant ratio of 1, 3, 5, 7, 9, etc., in which one equals the area of the central circle and the other figures the relative areas of the successive annuli from the center outward. For the sake of simplicity and to permit the ready comprehension of this principle of the ratio of the areas of concentric annuli of equal radial width, and also some of unequal radial width, I have included various diagrammatic illustrations in the accompanying drawings to show the application of the distribution of the cutting edges by exhibiting annuli of convenient widths, but it will be understood that more exact calculations would reduce the width and increase the number of annuli finally to a point beyond the possibility of mechanical application and toward infinity.

Figure 3:
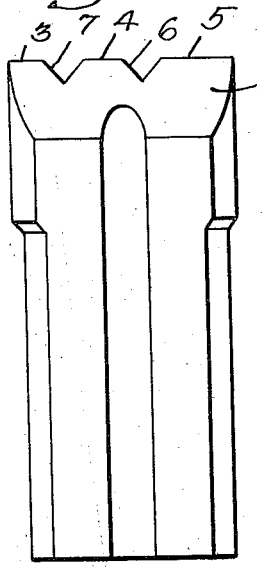
Figure 2:
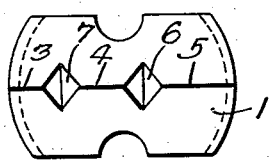
Figure 5:
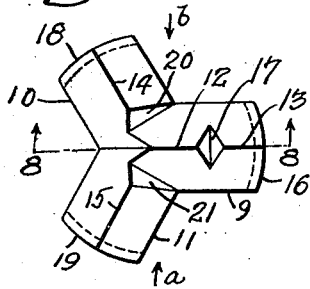
Figure 6:
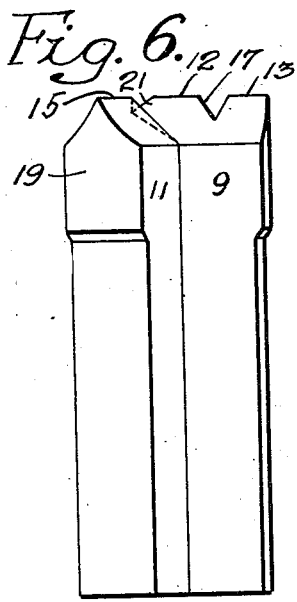
Figure 4:
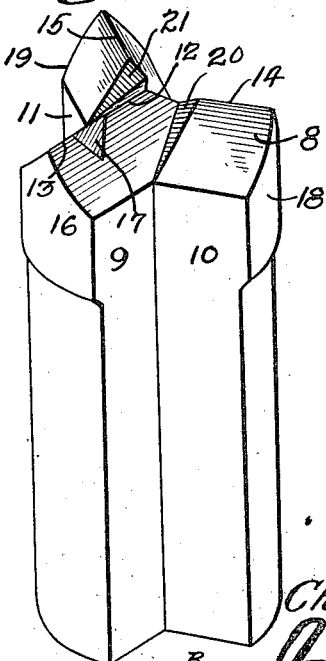
Figure 7:
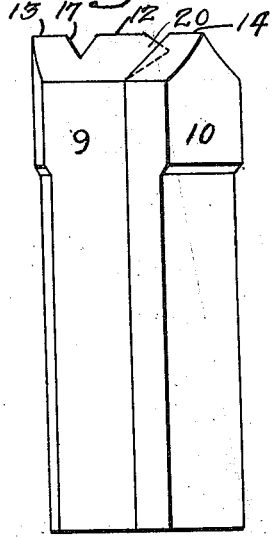
Figure 8:
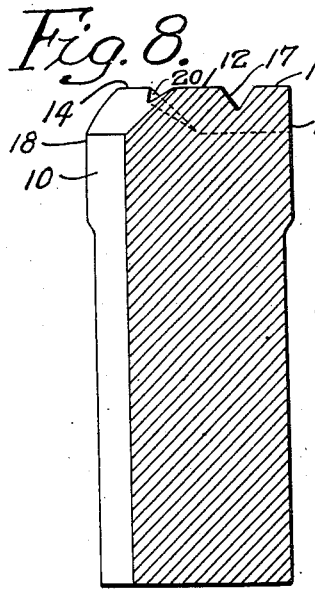
Figure 9:
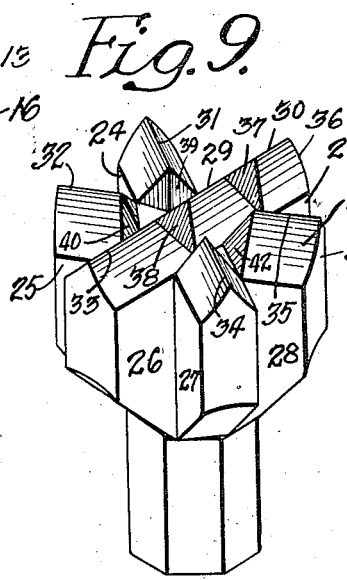
Figure 10:
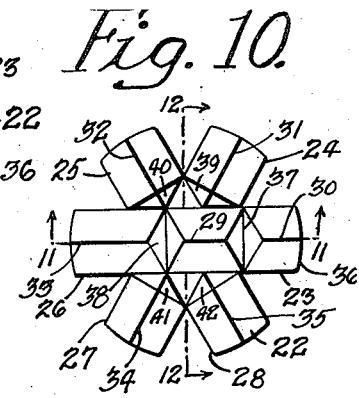
Figure 12:
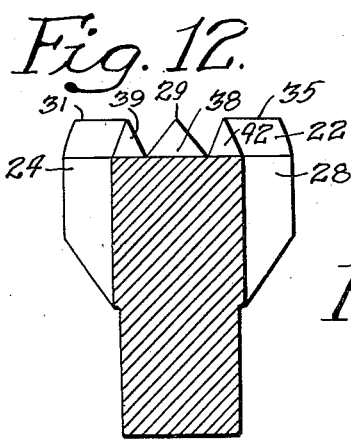
Figure 11:

This object, and other advantageous ends which will be described hereinafter, I attain in the following manner, reference being had to the accompanying drawings in which Figure 1 is a perspective view of a drill bit embodying the principle of my present invention and including three cutting edge portions, Fig. 2 is a top plan view of the bit shown in Fig. 1, Fig. 3 is a side elevation of the bit shown in Figs. 1 and 2, Fig. 4 is a perspective view of a bit constructed in accordance with my invention and including four cutting edge portions, Fig. 5 is a top plan view of the bit shown in Fig. 4, Fig. 6 is a side elevation looking in the direction of the arrow *a*, of Fig. 5, Fig. 7 is a side elevation of the bit looking in the direction of the arrow *b*, of Fig. 5, Fig. 8 is a section taken on the line 8—8 of Fig. 5, Fig. 9 is a perspective view of a drill bit made in accordance with my invention and including seven cutting edge portions, Fig. 10 is a top plan view of the bit shown in Fig. 9, Fig. 11 is a section taken on the line 11—11 of Fig. 10, Fig. 12 is a sectional elevation taken on the line 12—12 of Fig. 10, and Figs. 13 to 15, inclusive, are diagrammatic views illustrative of the relative cutting capacities of the cutting edge portions in the various forms of my bits as illustrated in Figs. 1 to 12, inclusive.

Referring to Figs. 1 to 3, inclusive, of the drawings, 1 represents the cutting end surface of the bit which tapers to produce a cutting edge 2. This cutting edge is interrupted or discontinued within its length to provide three cutting edge portions 3, 4, and 5. These interruptions in the cutting edge are produced by recesses 6 and 7 in the cutting end surface 1, the recess 6 extending from the point of coincidence of the cutting edge portion 4 with the axis of the bit and joining the cutting edge portion 5 at a point remote from the axis of the bit. In other words, the recess 6 forms an interruption of the cutting edge from the axis to a point remote from the axis. The recess 7 forms a discontinuation or interruption in the cutting edge and extends from the end of the cutting edge portion 4, which is remote from the axis, to the cutting edge portion 3. Thus no portion of the recess 7 includes the axis. In other words, the entire recess 7 is formed in the cutting end surface 1 and is entirely remote from the axis in distinction to the recess 6 which has a portion leading to the axis. This provision and arrangement of the recesses form an important feature of my invention, as will be hereinafter set forth.

It is obvious that a cutting edge ordinarily will wear away faster adjacent the circumference of the bit than it will adjacent the center of the bit and in bits made prior to my invention this latter mentioned condition of affairs has always been a source of trouble. By forming interruptions in the cutting edge, as above described, and thereby reducing the amount of cutting edge adjacent the axis, more work is imposed upon said latter mentioned portion of the cutting edge and thereby the portion of the cutting edge adjacent the center will wear away more rapidly than if the interruptions were not produced. By figuring the relative lengths of these interruptions a substantially equal amount of work can be imposed upon all portions of the cutting edge. In other words, the amount of cutting edge can be balanced to the work to be performed; for example in Figs. 1, 2, and 3, the portion 4 of the cutting edge is compelled to do more work than if the interruption or recess 6 were not present and the cutting edge made continuous between the portions 4 and 5. This is true because there is no other edge portion which cuts adjacent the axis of the bit.

Referring to Fig. 13, which is a diagrammatic representation illustrative of the cutting action of the bit illustrated in Figs. 1 to 3, and considering that the bit is adapted to drill a 5⅜″ circle and includes 3⅜″ of cutting edge, it will be found that by making the portion 3 of the cutting edge 1 1/16″ long, the portion 4 of the cutting edge 1″ long, and the portion 5 of the cutting edge 1 3/16″ long, the interruption between the portions 5 and 4 being 1″ and the interruption between the portions 4 and 3 being ¾″, all of the cutting portions will be required to do substantially the same amount of work.

Fig. 13 shows a central circle A and two annuli B and C. The annulus C has an area of 12.2841 square inches to be cut by 1⅝″ of cutting edge supplied in equal amounts by the cutting edge portions 3 and 5. This represents a proportion of 7.5594 square inches of surface per one inch of cutting edge. The annulus B has an area of 9.4248 square inches of surface to be cut by 1¼″ of cutting edge of which the cutting edge portion 5 supplies 1″ and the portion 3 supplies ¼″. This represents a proportion of 7.5398 square inches to be cut by 1″ of cutting edge. The area of the circle A is 3.1416 square inches to be cut by 1″ of cutting edge. Thus by the provision of the interruptions the portions of the cutting edge adjacent the center are made to do more work than if they were not present and the cutting edge made continuous.

In the form of my invention shown in Figs. 4 to 8, inclusive, I have illustrated a bit embodying the principle of my present invention which includes a cutting end surface 8 which is produced by three wings 9, 10, and 11. This cutting end surface 8 terminates in a cutting edge including four portions 12, 13, 14, and 15. The portion 12 extends from the axis toward the outer circumferential surface 16 and a recess 17 forms an interruption between the portion 12 and the portion 13, said portion 13 extending from the recess to said circumferential surface 16. The portions 14 and 15 of the cutting edge extend from a point remote from the axis to the circumferential surfaces 18 and 19, respectively, of the wings 10 and 11. The interruption between the portions 14 and 15 and the portion 12 at the axis is produced by the provision of recesses 20 and 21. The portion of the end surface 8, in alinement with each of the wings, tapers upwardly to form the respective cutting edge portions and the recesses, above described.

Fig. 14 is a diagrammatic representation of the work this form of bit is capable of doing when drilling a hole 5⅜″ in diameter and when employing 5 1/16″ of cutting edge and includes a circle D and annuli E and F. The annulus F has an area of 12.2841 square inches to be cut by 2 7/16" of cutting edge, the latter being provided in equal parts of 13/16" each by the portions 13, 14, and 15. This represents a proportion of 5.0396 square inches of surface per one inch of cutting edge. The annulus E has an area of 9.4248 square inches to be cut by 2" of cutting edge, said 2" being provided in equal lengths by the remaining parts of the cutting edge portions 14 and 15. This represents a proportion of 4.7124 square inches per one inch of cutting edge. The circle D has an area of 3.146 square inches and is cut solely by 1" of cutting edge supplied by the cutting edge portion 12.

In the form of my invention illustrated in Figs. 9, 10, 11, and 12, I have shown a bit in which the cutting end surface 22 is formed by six wings 23, 24, 25, 26, 27, and 28. The cutting edge is divided into seven portions 29, 30, 31, 32, 33, 34, and 35. The cutting edge portion 29 extends from the axis toward the circumferential surface 36 of the wing 23 and the interruption between this portion 29 and the portion 30 is produced by a recess 37, the portion 30 extending from the recess to said circumferential surface 36. The interruption between the cutting edge portion 29 and the cutting edge portion 33 is made by a recess 38, said recess interrupting or stopping the portion 29 at the axis. The remaining cutting edge portions 31, 32, 34, and 35 begin at points remote from the axis and extend to the respective circumferential surfaces of the wings 24, 25, 27, and 28 with which they are in direct alinement. The gaps or interruptions between the cutting edge portions 31, 32, 34, and 35 are made by providing recesses 39, 40, 41, and 42.

Figure 15:
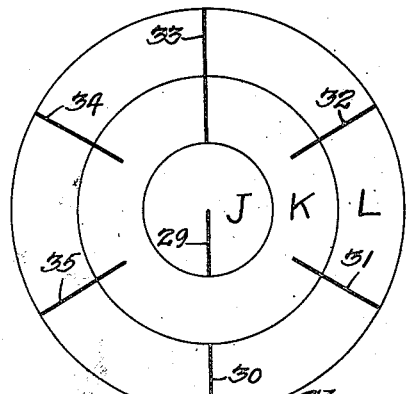

Fig. 15 is a diagrammatic representation of the work capable of being performed by the bit illustrated in Figs. 9 to 11, inclusive, and in said Fig. 15 is illustrated a circle J and annuli K and L. Considering that the bit is to drill a hole 3" in diameter and includes 5¼" of cutting edge, the following result will be obtained: The annulus L has an area of 3.9270 square inches to be cut by 3" of cutting edge supplied in equal lengths by the cutting edge portions 30, 31, 32, 33, 34, and 35. This represents a proportion of 1.3090 square inches per one inch of cutting edge. The area of the annulus K is 2.3562 square inches to be cut by 1¾" of cutting edge of which the portion 33 supplies ½" and each of the portions 31, 32, 34, and 35 supplies 5/16". This represents a proportion of 1.3464 square inches per one inch of cutting edge. The circle J has an area of .7854 square inch to be cut by ½" of cutting edge. This is supplied solely by the portion 29 and represents a proportion of 1.5708 square inches per one inch of cutting edge. It will thus be noted that all portions of the cutting edge in the form of my invention illustrated in Figs. 9 to 12, inclusive, perform practically the same amount of work and by the provision of the recesses in the location as specified, I am enabled to secure a bit in which all the cutting surfaces are practically balanced and in which the wear will be substantially equal on all portions of the cutting edge.

I wish it understood that while I have shown a number of different forms of bits and cutting edges my invention includes any bit having cavities, recessed surfaces, or interruptions in the cutting edges so as to distribute the active cutting edges on the face of the bit in proportion to the area of the surface over which they will operate in one complete revolution of the bit and in which certain of these interruptions of the cutting edge adjacent to the central part of the bit start from the axis of the bit and others being located at positions remote from the axis and not touching the same. My invention, therefore, includes any bit having a portion providing a cutting edge which is interrupted in its length by a recess in which a point on the perimeter of the recess or interruption to the cutting edge coincides with the axis of the bit and in which the cutting edge has other interruption provided by a recess in which no point on said latter recess coincides with or touches the axis of the bit.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A drill bit including a surface providing a cutting edge the length of which is included in a plane at right angles to the axis of the bit and in which the cutting edge is interrupted by a recess, the point of interruption of the cutting edge by the recess beginning at the axis of the bit, said cutting edge being interrupted by another recess which is located at a position remote from and not touching the axis of the bit, substantially as described.

2. A drill bit having a cutting edge, the length of said cutting edge being included in a plane at right angles to the axis of the bit, said cutting edge having an interruption beginning at the axis of the bit and another interruption located at a position entirely remote from the axis of the bit whereby the active cutting portions of the cutting edge are distributed in proportion to the area of surface over which they operate in one complete revolution of the bit so that all portions of the cutting edge do the same amount of work, substantially as described.

3. A drill bit including a plurality of cutting edge portions included in a plane at right angles to the axis of the bit and which are disconnected on their active cutting edges, one of said portions extending to the axis of the bit, the other of said portions being located at positions remote from the axis, certain of said portions being spaced from the axis by an interruption of the cutting edge portions, said interruption leading to the axis, and certain of said portions being spaced from another portion by a recess located at a position entirely remote from the axis, substantially as described.

In testimony whereof I have signed my name to this specification in the presence of two subscribing witnesses.

CHARLES A. BRAWN.

Witnesses:
 ROBERT MACBURNEY,
 M. M. KEANE.